Patented Jan. 27, 1925.

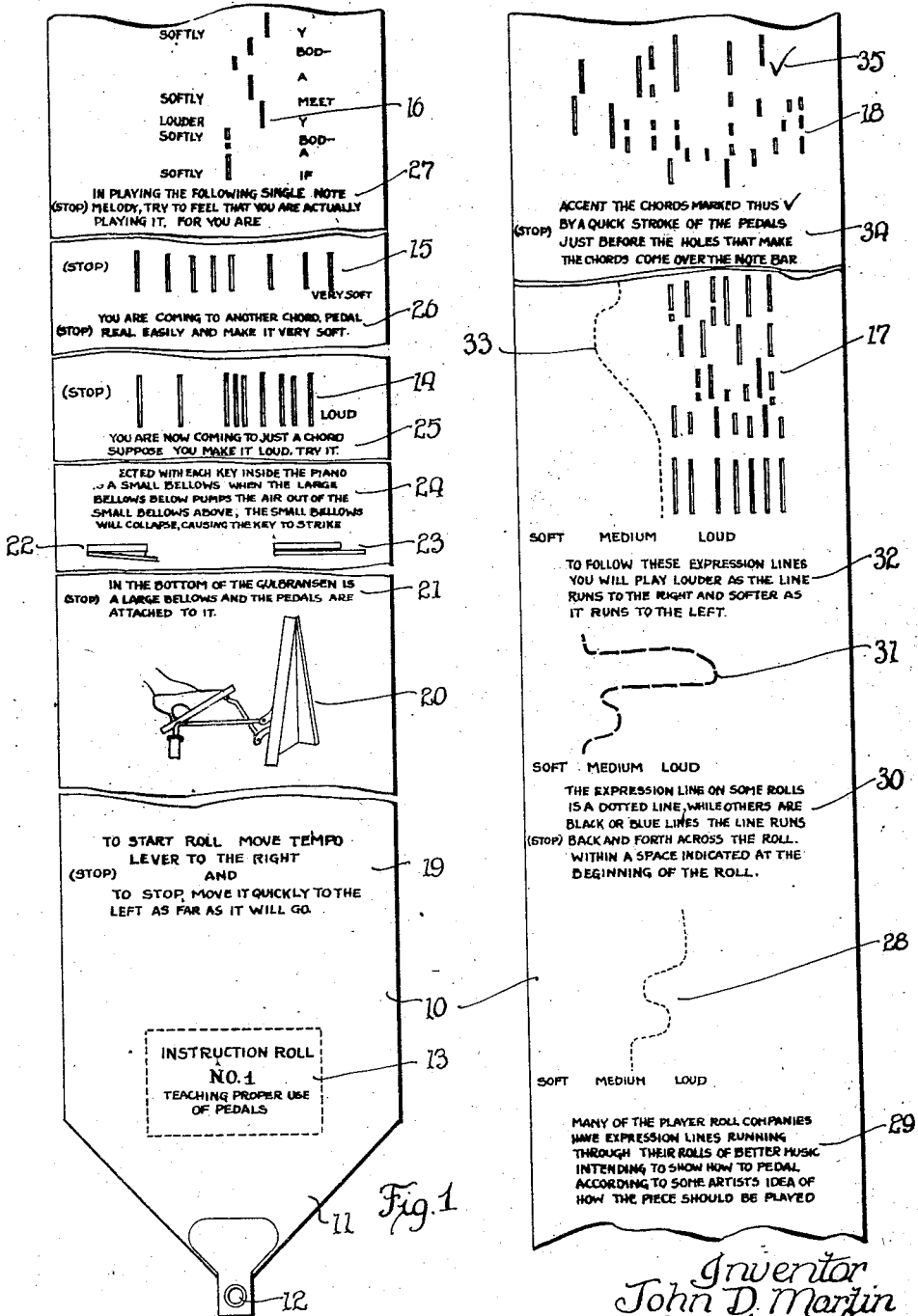

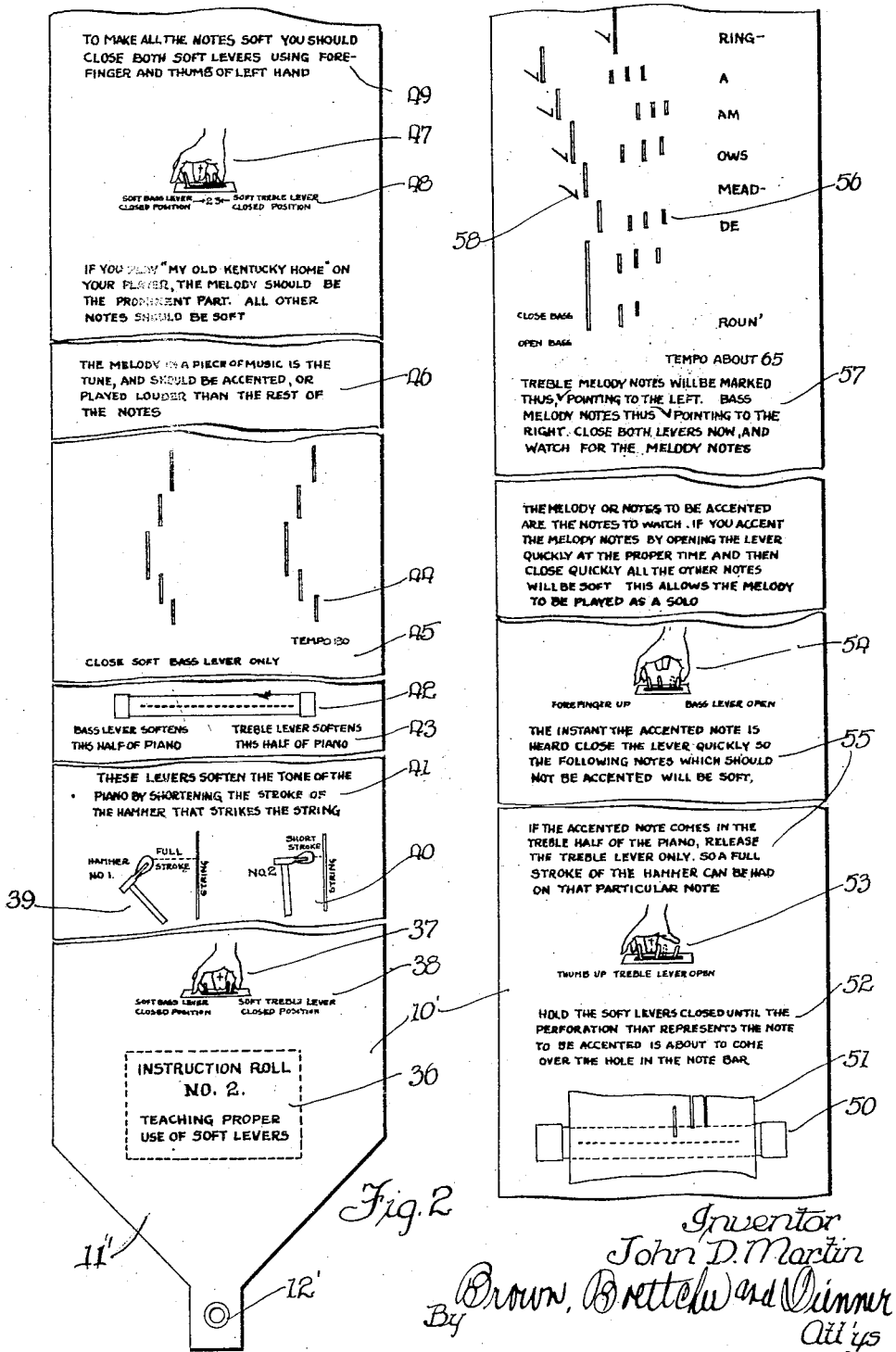

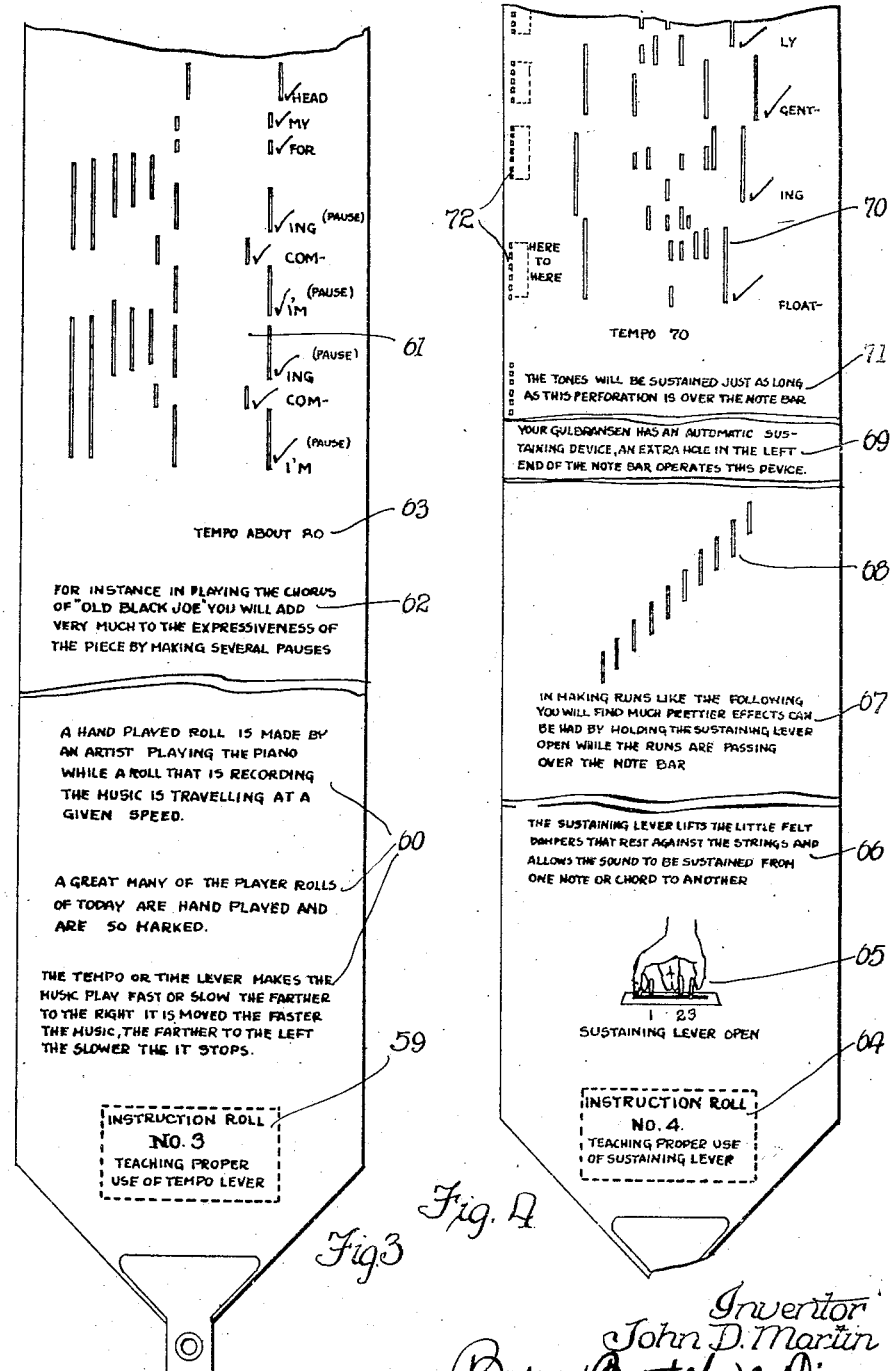

1,524,269

UNITED STATES PATENT OFFICE.

JOHN D. MARTIN, OF KANSAS CITY, MISSOURI, ASSIGNOR TO GULBRANSEN-DICKINSON COMPANY, OF CHICAGO, ILLINOIS, A CORPORATION OF ILLINOIS.

INSTRUCTION ROLL FOR PLAYER PIANOS.

Application filed April 11, 1921. Serial No. 460,269.

*To all whom it may concern:*

Be it known that I, JOHN D. MARTIN, a citizen of the United States, residing at Kansas City, in the county of Jackson and State of Missouri, have invented a certain new and useful Improvement in Instruction Rolls for Player Pianos (Case 1), of which the following is a full, clear, concise, and exact description, reference being had to the accompanying drawings, forming a part of this specification.

This invention relates to improvements in mechanically operated musical instruments, and more particularly to an improved method of and means for instructing in the operation of a player piano.

It has been found that while the operation of a player piano is to a large degree automatic, the proper manipulation of the controls for the regulation of tempo and expression to obtain a realistic reproduction of original playing is only accomplished by those either familiar with music, or those who have been carefully instructed in the use of the piano.

The primary aim of this invention is to afford means for instructing in the proper operation of a player piano or similarly mechanically operated instrument, in order that it may be within the scope of ability of anyone, regardless of musical education, to reproduce faithfully the piece of music as played originally by the artist.

It is a further aim of this invention to make the course of instruction interesting, as well as thorough, the instruction being so worded as to be readily understood by a normally educated person, so that while the student may be entirely uninformed on technical musical terms and phrases, he may learn to play the piano so that the desired technique of playing as produced by the artist will be reproduced in the player piano. Furthermore, it is not only interesting to the student, but will make more pleasant the production to those who may be listening.

Briefly stated, this invention comprises a web of paper in the form of a roll adapted for application to a standard player piano and having perforations therein for producing various chords or combinations of notes, together with instructions printed on the roll how to operate the controls to obtain different expressions. Illustrations are also placed on the web indicating the position of the hands and feet when playing the instrument. My invention is not to be confused with music rolls having words thereon for indicating the general way in which a composition, or passages thereof, should be played, this invention as well indicating the particular control lever which should be used to produce the desired result, both by words and illustrations. Furthermore, the relation of the perforations to the words and illustrations is such that the student is enabled to readily observe the difference in the note when played in one passage, and when played in another.

It will be apparent that the invention is not limited in its utility to player piano instruction, but may be applied to other manually operated mechanical musical instruments or similar mechanical organizations in which the user must be instructed to obtain the desired result.

While a plurality of rolls are used in actual manufacture, this is only done for convenience and, of course, where possible the whole course of instruction might be placed on a single web. Furthermore, the invention is such that the various rolls may be made for use on any standard make of mechanically operated player piano.

While I shall describe in detail a particular set of rolls containing a predetermined course of instruction, I reserve the right to vary the rolls in accordance with the instructions desired to be imparted, providing there is no departure from the scope of the claims.

A more concrete understanding of my invention may be obtained from the following detailed description taken in connection with the accompanying drawings, in which:

Figure 1 is a fragmentary view showing several extracts of a roll embodying the improvements of my invention, this roll being known as number 1. Figures 2, 3 and 4 are similar views of a second, third and fourth roll.

Referring more particularly to the drawings, there are illustrated portions of the instruction rolls, these rolls forming with additional exercise rolls (not shown) a complete course. The exercise rolls are similar to ordinary player piano rolls, and have ordinary passages of music or extracts of various exercises thereon, so that the student may practice the exercises and become proficient in the use of the instrument, subsequent to being instructed.

With reference to Figure 1 a web 10 is provided having the usual tapered end 11, provided with an eyelet 12 for engagement with the hook on the feeder roll of a player piano or similar instrument. Near this end of the roll is printed a number and title of the roll, at 13 in the present case.

The web 10 is provided with perforations arranged in groups, only a few of these groups being shown and designated respectively, 14, 15, 16, 17 and 18.

The web has printed instructions thereon at 19 describing how to start and stop the music roll while in operation. An illustration of the large bellows and pedals is then inserted at 20, and beyond that explanatory printed matter 21 relating thereto. There are printed on the web illustrations 22 and 23 of the small bellows, "Open" and "Closed", respectively, together with printed matter 24 explanatory thereof. This printed matter may include a statement of the effects of pedaling hard and easily to produce loud or soft tones, as may be desired. There is also a general description of the operation of the small bellows, in response to the passage of the perforations in the web over the tracker bar. Descriptive matter in the course of the instructions is printed on the web which will aid the student in appreciating the construction and the proper manipulation of the controls, this being omitted from the drawings for convenience in describing.

The group of perforations 14 and 15 and the descriptive phrases 25 and 26 arranged adjacent thereto form the first exercise. It will be noted that these perforations form chords by which the student may be able to distinguish quickly the effect of pedaling hard and pedaling easily.

Further along the web is printed explanatory matter 27 relating to the perforations 16 and to the left of the perforations 16 the words "Softly" and "Louder" are printed to indicate those passages of the piece of music which are to be played loudly or softly.

As is well known to those skilled in the art, the ordinary piano roll does not place the words on the web to indicate when to play loudly and when to play softly, but that this is indicated by a line such as is shown at 28 in Figure 1, and an arrow is arranged by which the operator of the piano may follow this line and thus obtain the effect desired. These lines are commonly known as "expression" lines. The descriptive matter at 29 on the right-hand portion of Figure 1 printed on the web explains what these lines are for, and how to follow the same.

Farther along on the web is additional printed matter 30, and a dotted line 31, this line being used by some player pianos and included in the instructions. At 17 perforations are provided making chords, and explanatory matter relating thereto is printed at 32, an expression line 33 being placed on the web so that the lessons learned from the lines 28 and 31 may be applied to a practical group of chords.

The perforations 18 are explained at 34, and the explanatory matter 34 contains a reference to the check marks 35 employed in obtaining, as desired, accentuation or expression of chords.

It will be quite obvious that numerous other instructions besides those disclosed in Figure 1 and hereinbefore described are embodied in this roll, those disclosed in the drawings merely illustrating the general makeup of the roll and the manner in which the student is carried through the instructions from the point of instruction in the fundamental principles up to the actual use of the parts referred to.

Referring now to Figure 2 wherein the instructions in the proper use of the soft lever are set forth, the web 10' is provided with the tapered end 11' carrying the eyelet 12' for connection to the feeder rolls. Just beyond the title of the roll as at 36 is printed an illustration 37 of the manner of manipulating the soft lever, together with printed matter 38 relating thereto. An illustration of the hammers when producing "full" and "short" strokes, is provided at 39 and 40, respectively, and above these illustrations is descriptive matter 41 relating thereto. Beyond this is an illustration 42 of the tracker or note bar, together with descriptive matter 43 relating thereto. Beyond the illustration of the tracker bar, a plurality of perforations 44 forming chords are provided, these having descriptive matter 45 relating thereto printed ahead of the chords. Further descriptive matter 46 is provided relating to the control of the levers and the purpose of accenting parts of the piece of music being played.

The illustration 37 referred to hereinbefore shows the levers in one position, and in the illustration 47 the levers are shown in another position, and descriptive matter 48 relating thereto is printed on the web below the illustration. Further descriptive matter 49 relating thereto is also printed on the web. An illustration of the tracker bar 50 with a note sheet 51 passing thereover is printed on the web, and matter 52 explanatory thereof is also provided. Third and fourth illustrations 53 and 54, respectively, of the soft levers are provided, and reading matter 55 is printed on the web explanatory thereof.

Particular attention is directed to the illustrations 37, 47, 53 and 54, as these serve to clearly indicate the proper manner of holding the hands on the various levers during operation of the piano.

As an example of the manipulation of the levers, in accordance with the illustrations described hereinbefore, and arranged in proper order on the web to form a passage of music, is provided a group of perforations 56, together with the printed matter 57 relating thereto, these perforations in the web being marked as at 58 by the check marks, for indicating the proper use of the lever throughout the playing of this piece of music.

It will be noted that starting at the beginning of the web, and using the same throughout and following the instructions printed thereon, together with the illustrations, a proper understanding of the operation of these levers will be attained by the student.

Referring now to Figure 3, the roll having the instructions in the proper use of the tempo lever is illustrated, the web of this roll having a number and title thereon at 59. Printed matter explanatory of the tempo lever, and use thereof, is printed at 60 and beyond this are perforations 61 forming a passage of music. Printed matter explanatory thereof is provided at 62. A printed indication of tempo to be used is provided at 63.

Referring now to Figure 4, the fourth or last roll of instructions is shown. This roll instructs in the purpose, function and operation of the sustaining lever, and has its number and title printed at 64. An illustration of the proper manner of manipulating the sustaining lever is shown at 65, and matter explanatory of the sustaining lever is printed at 66. Further printed matter is placed at 67, relating to the perforations 68.

Beyond the run or passage of music formed by the perforations 68 is a printed reference 69 relating to a particular type of player piano, and a piece of music formed by the perforations 70 is located beyond the printed matter 69. The printed matter 71 relating to the perforations is provided and a plurality of perforations 72 are formed illustrating the automatic operation of the sustaining lever in that particular type of piano.

In addition to the four rolls illustrated and described, one or more rolls may be added to a set of instruction rolls containing exercises which the student may practice in order to become proficient in the use of the various controls of the instrument. It will be observed that the student is conducted through a regular course of instructions, such as would be given by one skilled in the use of the piano, from the fundamental principles of the instrument to the practical operation or playing of the same. Numerous modifications of the details of the course of instructions may be made to suit various pianos, and it will be seen that the system as embodied in the present invention is of sufficient flexibility to be readily adaptable to all standard makes of player pianos. It will therefore be understood that I contemplate making such changes in the details of the course of instructions as contained on the various rolls, so that the course may be capable of adaptation to various makes of pianos, such changes as are made, being, of course, within the spirit of the invention and scope of the claims.

I claim:

1. An instruction roll for mechanically operated instruments comprising a sheet having perforations for causing the sounding of the notes of the instrument and provided also with instructive matter explaining how to operate the mechanism of the instrument to properly produce the mechanical rendition of the notes.

2. An instruction roll for mechanically operated instruments comprising a sheet having means directly thereon for instructing how to operate the mechanism of the instrument to properly produce the mechanical rendition on the instrument.

3. The combination with a musical instrument of a sound record having a musical rendition recorded thereon and instructive matter directly on said record explaining how to operate the mechanism of the instrument to properly produce mechanically upon the instrument the rendition recorded on the record.

4. An instruction device comprising a sound record having a musical rendition recorded thereon for audibly sounding a mechanical instrument in combination with visual instructions explaining and illustrating how to operate the mechanism of the instrument to properly produce mechanically upon the instrument the rendition recorded on the record.

5. An instruction roll for mechanically operated musical instruments comprising a sheet having perforations therein for mechanically sounding the notes of the instrument and instructive matter printed directly upon said sheet and relating to the proper mechanical rendition of the notes on the instrument.

6. An instruction roll for mechanically operated pianos comprising a sheet having sound producing perforations grouped in successive selections and arranged in such sequence as to instruct how to properly produce the mechanical rendition upon the instrument.

7. An instruction roll for mechanically operated musical instruments operated by a perforated note sheet and having manual control means, comprising a web having groups of perforations therein forming passages of music, and explanatory matter printed directly on said web relating to said control means and perforations.

8. An instruction roll for mechanically operated musical instruments operated by a perforated note sheet and having manual control means, comprising a web having groups of perforations therein forming passages of music, and explanatory matter relating to said control means and perforations printed directly on the web, said perforations and explanatory matter being adapted to be exposed in proper sequence to complete a course of instructions.

9. An instruction roll for mechanically operating musical instruments operated by a perforated note sheet and having manual control means, comprising a web having groups of perforations therein forming passages of music, illustrations of the controls and other working parts of the instrument printed directly on said web, and explanatory matter relating to said control means and perforations printed directly on the web.

10. An instruction roll for mechanically operated musical instruments operated by a perforated note sheet and having manual control means, comprising a web having groups of perforations therein forming passages of music, illustrations of the controls and other parts of the instrument printed directly on said web, and explanatory matter printed directly on the web relating to said control means, illustrations and perforations, said perforations, illustrations and explanatory matter being adapted to be exposed in proper sequence to complete a course of instructions.

11. An instruction roll for mechanically operated musical instruments operated by a perforated note sheet, comprising a web adapted to be used in connection with the instrument and having perforations therein forming passages of music, and instructions and illustrations of the working parts of the piano printed directly on said web in proper sequence and relation to said perforations to provide a continuous course of instructions.

12. The combination with a mechanically operated musical instrument having a note bar and operated by a perforated sheet adapted to pass thereover, and manual control means for said instrument, of an instruction roll for said instrument comprising a web adapted to be run over said note bar, said web having perforations forming passages of music to be played and explanatory matter and illustrations relating to said controls and perforations printed directly on said web.

13. The combination with a mechanically operated musical instrument having a note bar and operated by a perforated sheet adapted to pass thereover, and manual control means for said instrument, of an instruction roll for said instrument comprising a web adapted to be run over said note bar and having printed directly thereon explanatory matter and illustrations relating to said controls and other parts of the instrument, perforations in said web forming passages of music to be played, said perforations and illustrations and explanatory matter being arranged in sequential relation to form a complete course of instruction.

14. An instruction roll for mechanically operated musical instruments comprising a web provided with groups of perforations and printed instructions and illustrations on said web explaining the effect of the perforations and indicating the manipulation of the controls of the instrument.

15. An instruction roll for mechanically operated musical instruments having manual control means, comprising a web provided with groups of perforations, illustrations printed directly on the web showing such control means, and instructions for the operation of said control means printed directly on the web and arranged in sequential order with said illustrations and groups of perforations.

16. A device for use with a mechanically operated musical instrument having means for controlling the mechanical playing thereof, said device being provided with means for selectively causing the sounding of the notes of a selection and means explaining the manipulation of the means for controlling the mechanical playing of the instrument.

17. A device for use with a mechanically operated musical instrument having means for controlling the mechanical playing thereof, said device being provided with means for selectively causing the sounding of the notes of a selection and means for indicating how the mechanical controlling means should be manipulated.

18. A perforated note sheet for use with a mechanically operated musical instrument, said sheet having instructions relating to the perforations to indicate which of the mechanically rendered notes of the selection should be regulated.

19. A perforated note sheet for use with a mechanically operated musical instrument, said sheet having instructions relating to the perforations to indicate how the expression and tempo of the mechanically rendered notes of the selection should be regulated.

20. A perforated note sheet for use with a mechanically operated musical instrument, said sheet having instructions relating to the perforations to indicate how the tempo and expression of the mechanically rendered notes of the selection should be regulated, and also having means for explaining the manipulation of the controls of the instrument.

In witness whereof, I hereunto subscribe my name this 6th day of April, 1921.

JOHN D. MARTIN.